United States Patent
Ogawa

(10) Patent No.: US 9,869,994 B2
(45) Date of Patent: Jan. 16, 2018

(54) SIMULATION APPARATUS FOR MANUAL OPERATION OF MACHINE TOOL

(71) Applicant: DMG MORI SEIKI CO., LTD., Nara (JP)

(72) Inventor: Tetsuo Ogawa, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 296 days.

(21) Appl. No.: 14/636,788

(22) Filed: Mar. 3, 2015

(65) Prior Publication Data

US 2015/0268661 A1 Sep. 24, 2015

(30) Foreign Application Priority Data

Mar. 19, 2014 (JP) .................................. 2014-056399

(51) Int. Cl.
*G05B 19/4097* (2006.01)
*G05B 19/4061* (2006.01)

(52) U.S. Cl.
CPC ..... *G05B 19/4097* (2013.01); *G05B 19/4061* (2013.01); *G05B 2219/35216* (2013.01); *G05B 2219/49157* (2013.01)

(58) Field of Classification Search
CPC ............ G05B 19/4097; G05B 19/4061; G05B 2219/49157; G05B 2219/35216
See application file for complete search history.

(56) References Cited

U.S. PATENT DOCUMENTS 5,315,523 A * 5/1994 Fujita ................. G05B 19/4069
700/180
5,801,709 A * 9/1998 Suzuki .................... G06T 15/10
345/424

FOREIGN PATENT DOCUMENTS

| JP | H10161720 A | 6/1998 |
| JP | 2000084794 A | 3/2000 |
| JP | 2006190228 A | 7/2006 |
| JP | 2007-249671 | 9/2007 |
| JP | 2011206894 A | 10/2011 |

OTHER PUBLICATIONS

He et al., "Haptic-aided robot path planning based on virtual tele-operation", 2008 Elsevier.*

* cited by examiner

*Primary Examiner* — Carlos Ortiz Rodriguez
(74) *Attorney, Agent, or Firm* — Miller, Matthias & Hull LLP

(57) ABSTRACT

A simulation apparatus 1 includes a touch panel 20, a display controller 11, a display screen data storage unit 12, an input control unit 13, an operation information storage unit 14, a model data storage 16, a simulation executor 15 and an NC program generator 17. The simulation executor 15 displays an image of a movable structure 12 to be operated on the touch panel 20, moves the image in accordance with a manual operation and checks occurrence of interference, and, in the case where interference occurs, stops the movement of the image and displays the occurrence of interference on the touch panel 20. Further, in the case where it is confirmed that no interference occurs, the NC program generator 17 generates an NC program based on manual operation information.

5 Claims, 4 Drawing Sheets

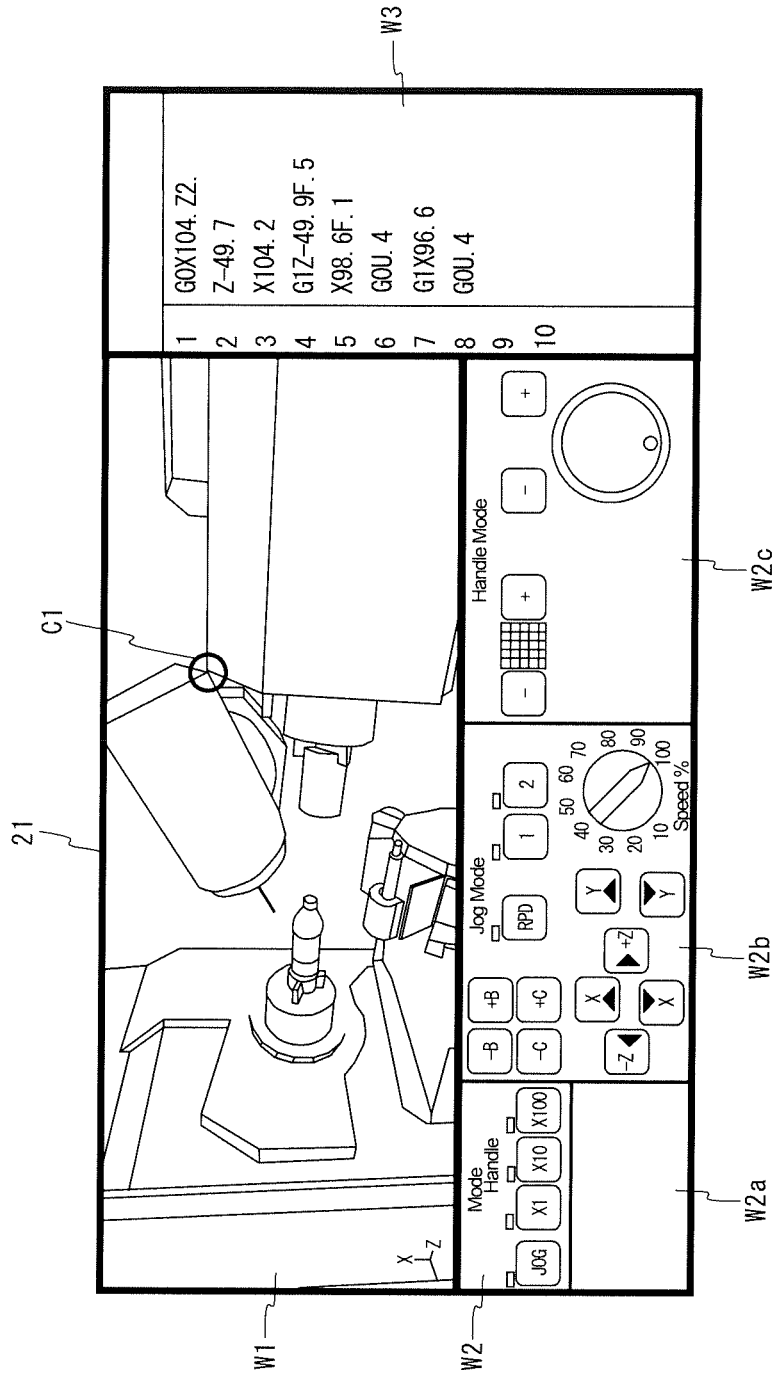

SIMULATION APPARATUS FOR MANUAL OPERATION OF MACHINE TOOL

BACKGROUND

Field of the Disclosure

The present disclosure relates to a simulation apparatus that is attached to a machine tool and is configured to move a model of a movable structure being a constituent of the machine tool by manual operation.

Background of the Disclosure

In the field of NC (numerically controlled) machine tools, for example, in the case where machining is performed using an NC program, if there is any error in the NC program, then there is a possibility that a movable structure, e.g., a tool rest, a table, a spindle head or the like, that is driven and controlled in accordance with the NC program interferes with another structure. Therefore, in the case where machining is performed using a new NC program having no machining performance record, operation of the NC program is checked in advance.

Further, as a technique for performing the operation check (interference check), there has conventionally been employed a so-called simulation technique in which the presence of interfere is virtually checked by using a model of the machine tool and moving the model in accordance with the NC program.

Further, besides automatic operation using an NC program, machining by moving the movable structure by manual operation is also usually performed. Such machining by manual operation is basically performed under a situation where interference can be avoided because it is performed while an operator is visually checking the operation state of the movable structure. However, in the case of an operator lacking skills, interference can occur due to the operator's misoperation.

Therefore, there has conventionally been suggested an interference prevention method as disclosed in Japanese Unexamined Patent Application Publication No. 2007-249671 (hereinafter "the JP '671 application") mentioned below. In the interference prevention method disclosed in the JP '671 application, a moving direction of a movable body is recognized based on its current position and a command by a manual operation, an intersection of a straight line extending in the moving direction from a current position of a three-dimensional model surface of the movable body and a three-dimensional model surface of an interfering structure is calculated, a no-entry area is set based on the intersection, and then the movable body is moved in the moving direction. When the movable body reaches a position in front of the no-entry area, a deceleration processing is automatically performed to stop the movement of the movable body and an alarm is emitted.

SUMMARY OF THE DISCLOSURE

However, the above-mentioned interference prevention method disclosed in the JP '671 application has a problem as explained below.

That is, in the above-mentioned interference prevention method disclosed in the JP '671 application, when a manual operation is performed by an operator, the movement of the movable body is not started until the no-entry area is set. In other words, there is a time-lag between the manual operation and the start of the movement of the movable body. Accordingly, there is a problem that the operator feels something strange in the operation and cannot perform a delicate operation. In the case of actual machining by manual operation, a tool and a workpiece are brought into contact with each other; therefore, smooth operability is required so that the operator can perform machining without anxiety.

Further, if, during a removal operation, interference is predicted and the operation is stopped, a machining mark may be left on the workpiece, and it is therefore possible that the workpiece becomes a defective product due to the machining mark even if the workpiece is re-machined.

The present disclosure has been achieved in view of the above-described circumstances, and an object thereof is to provide a simulation apparatus for manual operation of machine tool that enables safe performance of machining based on a manual operation command by previously checking interference between a movable structure to be operated based on the manual operation command and other structures and moving the movable structure along a movement path after the check.

The present disclosure, for achieving the above-described object, relates to a simulation apparatus for manual operation of machine tool, provided on a machine tool having structures including at least one movable structure, a drive member driving the movable structure, a numerical controller controlling operation of the drive member, and a display device, including:

a model data storage storing therein at least model data relating to the movable structure and model data relating to other structures having the possibility of interference with the movable structure within a movable area of the movable structure;

a display controller displaying images relating to a model of the movable structure and models of the other structures on the display device;

a manual operation signal generator having a manual operation unit and generating a manual operation signal for moving an image of the movable structure displayed on the display device in accordance with operation of the manual operation unit;

a simulation executor reading out the model data stored in the model data storage, arranging models relating to the other structures in a determined positional relationship and arranging a model relating to the movable structure in a predetermined positional relationship, and displaying an image relating to the models on the display device through the display controller, and receiving the manual operation signal generated by the manual operation signal generator and displaying an image in which the model relating to the movable structure is moved in accordance with the received manual operation signal on the display device through the display controller; and an NC program generator receiving information relating to the manual operation signal and a movement path of the movable structure from the simulation executor and generating an NC program based on the received manual operation signal information and movement path, the simulation executor being configured to also check whether interference occurs between the models of the structures when moving the model relating to the movable structure in accordance with the manual operation signal, and in the case where interference occurs, provide a display indicating the occurrence of interference on the display device through the display controller According to this simulation apparatus for manual operation of machine tool, first, the model data stored in the model data storage is read out by the simulation executor, and, in an appropriate virtual space, models relating to the other structures are arranged in a determined positional relationship, that is, the actual positional relationship, and a model relating to the movable structure is arranged in the actual positional relationship with respect to the models of the other structures based on position information on the movable structure obtained from the numerical controller. Then, an image relating to the thus arranged models is displayed on the display device under control by the display controller.

Subsequently, once an operator operates the manual operation unit and thereby a manual operation signal for moving an image of the movable structure displayed on the display device is generated by the manual operation signal generator, the simulation executor receives the manual operation signal from the manual operation signal generator, displays an image in which the model relating to the movable structure is moved in accordance with the received manual operation signal on the display device through the display controller, and checks whether interference occurs between the model relating to the movable structure and the models relating to the other structures. In the case where interference occurs, the simulation executor provides a display indicating the occurrence of interference on the display device through display controller.

Thus, by virtue of the simulation using models, the operator can execute virtual machining by the same operation as an actual manual operation while viewing images of the movable structure and the other structures and check whether interference occurs between the movable structure and the other structures when moving the movable structure along a movement path in accordance with the manual operation. Further, since a display indicating occurrence of interference is displayed in the case where interference occurs, the operator can easily recognize the fact that interference occurs.

It is noted that, as for the display provided in the case where interference occurs, any display mode can be adopted as long as it is possible to inform the operator of the fact that interference occurs. For example, a warning display by letters and a highlight display, e.g., circling or boxing the portion where interfere occurs or causing the portion to blink, can be mentioned as examples.

In the case where it is confirmed by the simulation by the simulation executor that no interference occurs, an NC program is generated by the NC program generator based on information necessary for generating the NC program which are received from the simulation executor, e.g., manual operation information including spindle rotation speed, movement speed of the movable structure, tool number, and coolant ON/OFF, a movement path of the movable structure, etc.

Consequently, by performing actual machining using the thus generated NC program, the operator can safely execute actual machining in accordance with his manual operation. Further, unlike the conventional art, there is no possibility that actual machining is interrupted due to occurrence of interference; therefore, there is no occurrence of a defective product due to interruption of machining It is noted that the manual operation signal generator may be composed of independent components which are not connected to the numerical controller or may be composed of components for actual manual operation of the machine tool which are connected to the numerical controller, for example, operation keys, a pulse handle and the like provided on an operation panel. However, in this case, in order to achieve the present disclosure, it is necessary to cause the numerical controller not to execute control in accordance with a manual operation signal at the time of simulation of the manual operation signal.

Further, in the simulation apparatus for manual operation according to the present disclosure, the simulation executor may be configured to, in the case where interference occurs when moving the model relating to the movable structure in accordance with the manual operation signal, display an image in which the model relating to the movable structure has been returned to its initial position.

When thus configured, in the case where interference occurs between the structures, the operator can re-execute manual operation with the movable structure having been returned to its initial position without performing a special operation; therefore, an efficient simulation can be performed.

Further, in the simulation apparatus for manual operation according to the present disclosure, the simulation executor may be configured to, in the case where interference occurs when moving the model relating to the movable structure in accordance with the manual operation signal, display an image in which the model relating to the movable structure has been returned to an operation position just before the occurrence of interference.

When thus configured, in the case where interference occurs by the manual operation, the operator can restart manual operation in a state just before the occurrence of interference; therefore, a more efficient simulation with no repetition of an unnecessary operation can be performed.

Further, in the simulation apparatus for manual operation of machine tool according to the present disclosure, the simulation executor may be configured to, in the case where the movement of the movable structure is for machining a workpiece, calculate a depth of cut in the machining, and the NC program generator may be configured to correct machining conditions in the NC program to be generated in accordance with the depth of cut calculated by the simulation executor.

Because the simulation is not accompanied by actual machining, it is difficult for the operator to estimate how load will be in actual machining Therefore, it is possible that the operator sets a spindle rotation speed and a tool feed rate in the manual operation to values larger than appropriate values even though the depth of cut is large or sets a spindle rotation speed and a tool feed rate in the manual operation to values smaller than appropriate values even though the depth of cut is relatively small. In such cases, machining conditions in the NC program generated based on the manual operation at the time of the simulation may not be necessarily suitable for actual machining. Therefore, when the apparatus is configured so that machining conditions, that is, a spindle rotation speed and a tool feed rate, at the time of the manual operation are corrected to appropriate values in accordance with the depth of cut at the time of the simulation when generating the NC program, a more appropriate machining can be achieved.

As described above, according to the present disclosure, by virtue of the simulation using models, an operator can execute virtual machining by the same operation as an actual manual operation while viewing images of the movable structure and the other structures and check whether interference occurs between the movable structure and the other structures when moving the movable structure along a movement path in accordance with the manual operation. Further, since a display indicating occurrence of interfere is displayed in the case where interference occurs, the operator can easily recognize the fact that interference occurs.

Further, after the interference check by the simulation is performed, an NC program in accordance with the simulation is automatically generated; therefore, performing machining using this NC program enables the operator to safely execute machining in accordance with his manual operation. Further, unlike the conventional art, there is no possibility that actual machining is interrupted due to occurrence of interference; therefore, there is no occurrence of a defective product due to interruption of machining.

Further, when the apparatus is configured so that, in the case where interference occurs, the image of the movable structure is returned to its initial position, it is possible to re-execute manual operation without performing a special operation; therefore, an efficient machining can be performed.

Furthermore, when the apparatus is configured so that, in the case where interference occurs, the image of the movable structure is returned to an operation position just before the occurrence of interference, it is possible to restart manual operation in a state just before the occurrence of interference; therefore, a more efficient simulation with no repetition of an unnecessary operation can be performed.

Further, when the apparatus is configured so that a depth of cut at the time of workpiece machining is calculated by the simulation executor and machining conditions in the NC program to be generated are corrected by the NC program generator in accordance with the depth of cut calculated by the simulation calculation unit, a more appropriate machining based on the manual operation can be achieved.

BRIEF DESCRIPTION OF THE DRAWINGS

For a more complete understanding of the disclosed methods and apparatus, reference should be made to the embodiment illustrated in greater detail on the accompanying drawings, wherein:

FIG. 4 is an explanatory diagram showing an example of a display screen displayed on the display unit when interference occurs in the embodiment.

DETAILED DESCRIPTION

Figure 1:
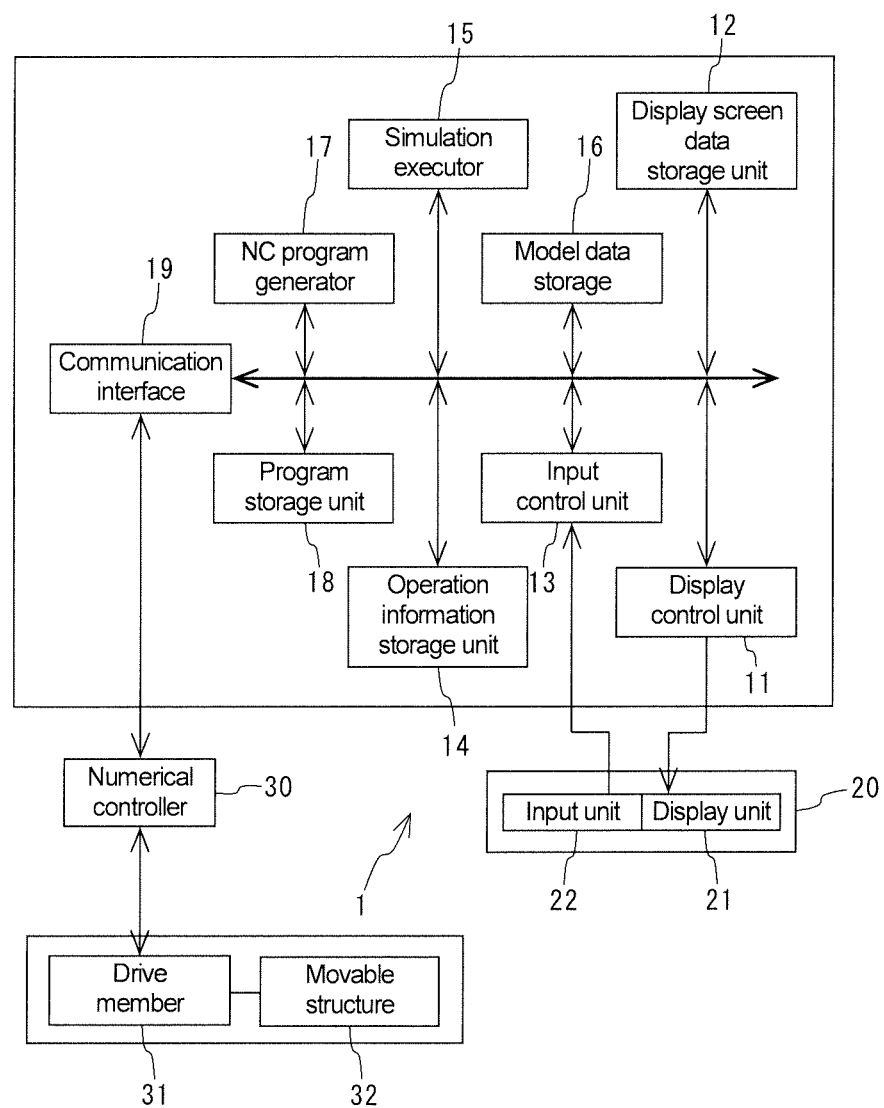
FIG. 1 is a block diagram showing a schematic configuration of a simulation apparatus for manual operation of machine tool according to one embodiment of the present disclosure.

A specific embodiment of the present disclosure will be described below based on the accompanying drawings. FIG. 1 is a block diagram showing a schematic configuration of a simulation apparatus for manual operation of machine tool.

As shown in FIG. 1, a simulation apparatus for manual operation (hereinafter, simply referred to as "simulation apparatus") 1 of the present embodiment includes a display controller 11, a display screen data storage unit 12, an input control unit 13, an operation information storage unit 14, a simulation executor 15, a model data storage 16, an NC program generator 17, a program storage unit 18, and a communication interface 19, which are connected to each other by a bus, and a touch panel 20 composed of a display unit 21 and an input unit 22.

It is noted that the simulation apparatus 1 is connected to a numerical controller 30 of a machine tool by the communication interface 19, and the numerical controller 30 drives a movable structure 32 by numerically controlling a drive member 31 of the machine tool.

The touch panel 20 is composed of the display unit 21 for displaying a screen and the input unit 22 arranged to lie on top of the display unit 21 for inputting a position signal relating to a position touched by an operator, and the display unit 21 can be visually recognized from the outside.

The display screen data storage unit 12 is a functional unit that stores therein data relating to display screens displayed on the display unit 21 of the touch panel 20. Further, in the present embodiment, particularly, the display screen data storage unit 12 stores therein screen data for defining a display area for displaying an image, screen data relating to softkeys for manual operation, and screen data for displaying an NC program. It is noted that the softkeys for manual operation include every well-known keys arranged on a so-called operation panel; for example, a normal rotation key, a reverse rotation key, and a stop key for a spindle, keys for moving a tool rest (X-axis plus key, X-axis minus key, etc.), keys for selecting or adjusting tool rest movement speed (feed rate), keys for selecting a tool rest, keys for adjusting spindle rotation speed, and keys for coolant ON/OFF can be mentioned as examples.

The display controller 11 is a functional unit that controls display on the display unit 21 of the touch panel 20, and displays an appropriate screen on the display unit 21 based on the screen data stored in the display screen data storage unit 12. Further, in the present embodiment, for example, when an operator presses a manual operation simulation key displayed on the display unit 21 of the touch panel 20, the display controller 11 displays a screen in which the display unit 21 is divided into three display areas, and displays a screen for displaying an image in one of the display areas, a screen in which the softkeys for manual operation are arranged as appropriate, that is, a manual operation screen, in another one of the display areas, and a screen for displaying an NC program in the other display area.

Figure 2:
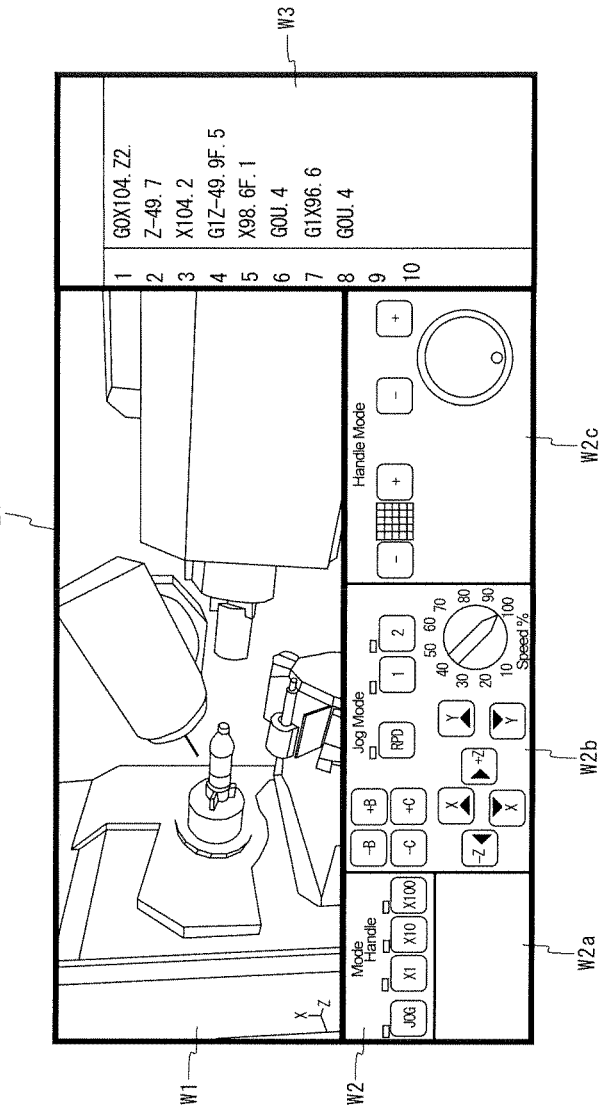
FIG. 2 is an explanatory diagram showing an example of a display screen displayed on a display unit according to the embodiment.

FIG. 2 shows an example of the display screen displayed on the display unit 21 of the touch panel 20. In FIG. 2, W1 denotes the display area for displaying an image; W2 denotes the display area for displaying the manual operation screen; and W3 denotes the display area for displaying an NC program. Further, the manual operation screen consists of 1) an operation screen W2a in which keys for selecting a multiplier for JOG feed and handle feed are displayed, 2) an operation screen W2b in which normal rotation and reverse rotation keys for B axis, normal rotation and reverse rotation keys for C axis, speed selection keys for JOG feed, axis movement keys, and a feed rate adjustment volume are displayed, and 3) an operation screen W2c relating to handle feed.

The operation information storage unit 14 is a functional unit that stores therein manual operation information which is defined corresponding to a position on the manual operation screen displayed on the display unit 21 of the touch panel 20, that is, manual operation information which corresponds to the softkeys and the like of the manual operation screen.

The input control unit 13 is a processing unit that processes a signal input from the input unit 22 of the touch panel 20. In the present embodiment, particularly, the input control unit 13 performs a processing of receiving a position signal input from the input unit 22 corresponding to the manual operation screen, generating, based on the received position signal, a manual operation signal corresponding to the position signal with reference to the manual operation information stored in the operation information storage unit 14, and transmitting the generated manual operation signal to the simulation executor 15. For example, when a spindle normal rotation key on the manual operation screen is pressed, a position signal thereof is input to the input control unit 13 from the input unit 22; in the input control unit 13, it is determined, with reference to the manual operation information stored to the operation information storage unit 14, that the manual operation information corresponding to the received position signal is a spindle normal rotation command, and a spindle normal rotation signal is generated; and the generated spindle normal rotation signal is transmitted to the simulation executor 15.

It is noted that, in the present embodiment, the manual operation screen displayed on the display unit 21 functions as an operation unit, and a processing unit that includes, besides the operation unit, the display screen data storage unit 12, the display controller 11, the operation information storage unit 14, and the input control unit 13 functions as a manual operation signal generator. Further, a manual operation signal generated by these units is not to be transmitted to the numerical controller 30, or, even if it is to be transmitted, it is not to be executed in the numerical controller 30.

The model data storage 16 is a functional unit that stores therein model data relating to the movable structure 32, e.g., a tool, a spindle, a chuck, a carriage, a tool rest, etc. and model data relating to structures having the possibility of interference with the movable structure 32, and these model data are previously stored in the model data storage 16 through an appropriate input device. It is noted that these model data may be three-dimensional model data or two-dimensional model data; however, in order to surely check interference relationship, it is preferred that they are three-dimensional model data.

For example, when the operator presses a manual operation simulation key displayed on the display unit 21 of the touch panel 20, the simulation executor 15 starts a processing. First, based on the model data relating to the structures stored in the model data storage 16, the simulation executor 15 arranges models relating to structures other than the movable structure 32 in a determined positional relationship (the actual positional relationship) in an appropriate virtual space and arranges a model relating to the movable structure 32 in the actual positional relationship based on position information on the movable structure 32 obtained from the numerical controller 30. Then, an image relating to the thus arranged models is displayed on the display unit 21 of the touch panel 20 under control by the numerical control unit 11 (see the display area W1 in FIG. 2).

Then, when a manual operation signal is transmitted from the input control unit 13, the simulation executor 15 displays an image in which the model relating to the movable structure 32 is moved in accordance with the received manual operation signal on the display unit 21 through the input control unit 11, and successively stores therein information relating to the manual operation which is successively transmitted from the input control unit 13.

Figure 3:
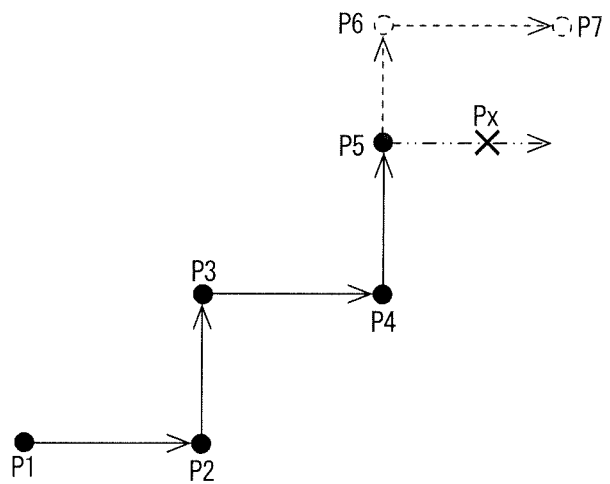
FIG. 3 is an explanatory diagram showing an example of a path along which a movable structure is moved in the embodiment.

For example, in the case where the operator performs such an operation that the image of the movable structure 32 is successively moved from a position P1 to positions P2, P3, P4 and P5 as shown in FIG. 3, the simulation executor 15 successively stores therein position data relating to the positions P1, P2, P3, P4 and P5 (movement path data), a feed rate for movement to each of the positions, etc.

Further, simultaneously with the processing of moving the image, the simulation executor 15 checks whether interference occurs between the model relating to the movable structure 32 and the models relating to the other structures, and in the case where interference occurs, stops the model relating to the movable structure 32, that is, the movement of the image, and provides a display indicating the occurrence of interference on the display unit 21 through the display controller 11.

In FIG. 4, an image in the case where interference occurs between a tool spindle as the movable structure 32 and a headstock as a structure other than the movable structure 32 is shown (see the display area W1). In this example, a display is provided in which the occurrence of interference is highlighted by putting an image of a circle indicated by C1 on the interference portion. It is noted that the display indicating the occurrence of interference is not limited to such a display in which a certain image is put on the interference portion, and a highlight display in which the interference portion is caused to blink by changing the luminance thereof may be adopted.

Then, in the case where the manual operation processing is ended without occurrence of interference, the simulation executor 15 performs a processing of transmitting the stored information relating to the manual operation to the NC program generator 17.

The NC program generator 17 receives the information relating to the manual operation, e.g., manual operation information such as spindle rotation speed, movement speed (feed rate) of the movable structure 32, tool number, and coolant ON/OFF and information such as a movement path of the movable structure 32, from the simulation executor 15. Based on the information, the NC program generator 17 performs a processing of automatically generating an NC program and stores the generated NC program in the program storage unit 18, and performs a processing of displaying the NC program in the display area W2c on the display unit 21 through the display controller 11.

The program storage unit 18 is a function unit that stores therein an NC program; the NC program stored in the program storage unit 18 is transmitted to the numerical controller 30 though the communication interface 19 by an appropriate processing.

According to the simulation apparatus 1 of the present embodiment having the above-described configuration, for example, when an operator presses a manual operation simulation key displayed on the display unit 21 of the touch panel 20, simulation for a manual operation is started by the simulation executor 15.

By the simulation executor 15, first, the model data stored in the model data storage 16 is read out, and then, in an appropriate virtual space, models relating to structures other than the movable structure 32 is arranged in a determined positional relationship, that is, the actual positional relationship, and a model relating to the movable structure 32 is arranged in the actual positional relationship based on position information on the movable structure 32 obtained from the numerical controller 30. Then, an image relating to the thus arranged models are displayed on the display unit 21 (the display area W1) of the touch panel 20 under control by the display controller 11.

Further, simultaneously with this processing, based on the screen data stored in the display screen data storage unit 12, a manual operation screen is displayed on the display unit 21 (the display area W2) of the touch panel 20 by the display controller 11.

Then, when the operator operates the manual operation screen displayed on the display unit 21 and thereby a signal for moving the image of the movable structure 32 displayed on the display unit 21 is input from the input unit 22 and a manual operation signal is generated by the input control unit 13, the simulation executor 15 displays an image in which the model relating to the movable structure 32 is moved in accordance with the received manual operation signal on the display unit 21 through the display controller 11 and successively stores therein information relating to the manual operation which is successively transmitted from the input control unit 13.

Further, simultaneously with the processing of moving the image, the simulation executor 15 checks whether interference occurs between the model relating to the movable structure 32 and the models relating to the other structures, and in the case where interference occurs, stops the movement of the model relating to the movable structure 32 and provides a display indicating the occurrence of interference on the display unit 21 through the display controller 11.

Then, in the case where the manual operation processing is ended without occurrence of interference, the simulation executor 15 transmits the stored information relating to the manual operation to the NC program generator 17, and the NC program generator 17 automatically generates an NC program based on the manual operation information received from the simulation executor 15 and stores the generated NC program in the program storage unit 18, and performs a processing of displaying the generated NC program in the display area W2 of the display unit 21 through the display controller 11.

It is noted that the NC program stored in the program storage unit 18 is transmitted to the numerical controller 30 by an appropriate processing.

Thus, according to the simulation apparatus 1 of the present embodiment, by virtue of the simulation using models, the operator can execute virtual machining by the same operation as an actual operation while viewing images of the movable structure 32 to be operated and other structures and check whether interference occurs between the movable structure 32 and the other structures when the movable structure 32 is moved along a movement path in accordance with the manual operation. Further, since a display indicating occurrence of interference is to be provided in the case where interference occurs, the operator can easily recognize the fact that interference occurs.

Further, in the case where it is confirmed by the processing by the simulation executor 15 that no interference occurs, an NC program in accordance with the manual operation is automatically generated by the NC program generator 17; therefore, performing actual machining using this NC program enables the operator to safely execute actual machining in accordance with his manual operation. Further, unlike the conventional art, there is no possibility that actual machining is interrupted due to occurrence of interference; therefore, there is no occurrence of a defective product due to interruption of machining Thus, a specific embodiment of the present disclosure has been described above; however, a mode that can be adopted in the present disclosure is not limited thereto at all.

For example, in the above simulation apparatus 1, the simulation executor 15 may be configured to, in the case where interference occurs when moving the model relating to the movable structure 32 to be operated, display an image in which the model relating to the movable structure 32 has been returned to its initial position.

For example, in the example shown in FIG. 3, in the case where, it is confirmed that, after successively moving the image of the movable structure 32 to be operated from the initial position P1 to P2, P3, P4 and P5, the movable structure 32 interferes with another structure at a position Px in the middle of movement in the direction of the arrow indicated by a two-dot chain line, the simulation executor 15 displays an image in which the position of the image of the movable structure 32 has been returned to the initial position P1 on the display unit 21.

When thus configured, in the case where interference occurs between the structures, the operator can re-execute manual operation with the movable structure 32 having been returned to its initial position without performing a special operation; therefore, an efficient simulation can be performed.

Further, the simulation executor 15 may be configured to, in the case where interference occurs when moving the model relating to the movable structure 32 to be operated, display an image in which the model relating to the movable model 32 has been returned to an operation position just before the occurrence of interference.

For example, in the example shown in FIG. 3, in the case where it is confirmed that the movable structure 32 to be operated interferes with another structure at a position Px in the middle of moving the image of the movable structure 32 in the direction of the arrow indicated by a two-dot chain line from the position P5, the simulation executor 15 displays an image in which the position of the image of the movable structure 32 has been returned to the position P5, which is the position just before the interference position Px, on the display unit 21.

When thus configured, the operator can restart manual operation in a state just before the occurrence of interference and move the image of the movable structure 32 along a path where no interference occurs, for example, in FIG. 3, the path indicated by a broken line leading from the position P5 to a position P7 via a position P6; therefore, a more efficient simulation with no repetition of an unnecessary operation can be performed.

Further, a configuration can be employed in which the simulation executor 15 is configured to, in the case where the movement of the movable structure 32 is for machining a workpiece, calculate a processing quantity (for example, depth of cut) in the machining, and the NC program generator 17 is configured to correct machining conditions in the NC program to be generated in accordance with the depth of cut calculated by the simulation executor 15 with reference to machining conditions for reference which are stored therein.

Because the simulation is not accompanied by actual machining, it is difficult for the operator to estimate how load will be in actual machining Therefore, it is possible that the operator sets a spindle rotation speed and a tool feed rate in the manual operation to values larger than appropriate values even though the depth of cut is large, or sets a spindle rotation speed and a tool feed rate in the manual operation to values smaller than appropriate values even though the depth of cut is relatively small. In such cases, machining conditions in the NC program generated based on the manual operation at the time of the simulation may not be necessarily suitable for actual machining. Therefore, when the apparatus is configured so that machining conditions, that is, a spindle rotation speed and a tool feed rate, at the time of the manual operation are corrected to appropriate values in accordance with the depth of cut at the time of the simulation when generating the NC program, a more appropriate machining can be achieved.

Further, although the above embodiment has a configuration in which the manual operation signal for manually operating the movable structure 32 is generated by cooperation between the touch panel 20, the display screen data storage unit 12, the display controller 11 and the input control unit 13, the present disclosure is not limited to such a configuration and the manual operation signal may be generated by an operation switch (a push button, a snap switch or the like), a pulse handle and the like provided on an operation panel, which are conventionally well known. It is noted that, also in this case, it is necessary to, at the time of simulation of a manual operation, perform such a processing that the manual operation signal is not transmitted to the numerical controller 30 or such a processing that the manual operation signal is ignored by the numerical controller 30 so that the numerical controller 30 is prevented from executing control in accordance with the manual operation signal.

What is claimed is:

1. A simulation apparatus for manual operation of machine tool having structures including at least one movable structure, a drive member driving the movable structure, a numerical controller controlling operation of the drive member, and a display device, the simulation apparatus comprising:

a model data storage storing at least model data relating to the movable structure and model data relating to other structures having a possibility of interference with the movable structure within a movable area of the movable structure;

a display controller displaying images relating to a model of the movable structure and models of the other structures on the display device;

a manual operation signal generator having a manual operation unit and generating a manual operation signal for moving an image of the movable structure displayed on the display device in accordance with operation of the manual operation unit;

a simulation executor reading out the model data stored in the model data storage, arranging models relating to the other structures in a determined positional relationship and arranging a model relating to the movable structure in a predetermined positional relationship, and displaying an image relating to the models on the display device through the display controller, and receiving the manual operation signal generated by the manual operation signal generator and displaying an image in which the model relating to the movable structure is moved in accordance with the received manual operation signal on the display device through the display controller; and an NC program generator receiving information relating to the manual operation signal and a movement path of the movable structure from the simulation executor and generating an NC program based on the received manual operation signal information and movement path, the simulation executor being configured to also check whether interference occurs between the models of the structures when moving the model relating to the movable structure in accordance with the manual operation signal, in a case where interference occurs, immediately stop the movement of the model relating to the movable structure and provide a display indicating the occurrence of interference on the display device through the display controller, and display an image in which the model relating to the movable structure has been returned to its initial position, without depending on an external operation signal, and in a case where an interference-free movement path of the movable structure is confirmed, transmit information relating to the received manual operation signal and the interference-free movement path to the NC program generator.

2. The simulation apparatus of claim 1, wherein:

the simulation executor is configured to, in a case where the movement of the movable structure is for machining a workpiece, calculate a depth of cut in the machining, and the NC program generator is configured to correct machining conditions in the NC program to be generated in accordance with the depth of cut calculated by the simulation executor.

3. A simulation apparatus for manual operation of machine tool having structures including at least one movable structure, a drive member driving the movable structure, a numerical controller controlling operation of the drive member, and a display device, the simulation apparatus comprising:

a model data storage storing at least model data relating to the movable structure and model data relating to other structures having a possibility of interference with the movable structure within a movable area of the movable structure;

a display controller displaying images relating to a model of the movable structure and models of the other structures on the display device;

a manual operation signal generator having a manual operation unit and generating a manual operation signal for moving an image of the movable structure displayed on the display device in accordance with operation of the manual operation unit;

a simulation executor reading out the model data stored in the model data storage, arranging models relating to the other structures in a determined positional relationship and arranging a model relating to the movable structure in a predetermined positional relationship, and displaying an image relating to the models on the display device through the display controller, and receiving the manual operation signal generated by the manual operation signal generator and displaying an image in which the model relating to the movable structure is moved in accordance with the received manual operation signal on the display device through the display controller; and an NC program generator receiving information relating to the manual operation signal and a movement path of the movable structure from the simulation executor and generating an NC program based on the received manual operation signal information and movement path, the simulation executor being configured to also check whether interference occurs between the models of the structures when moving the model relating to the movable structure in accordance with the manual operation signal, in a case where interference occurs, immediately stop the movement of the model relating to the movable structure and provide a display indicating the occurrence of interference on the display device through the display controller, and display an image in which the model relating to the movable structure has been returned to an operation position just before the occurrence of interference, without depending on an external operation signal, and in a case where an interference-free movement path of the movable structure is confirmed, transmit information relating to the received manual operation signal and the interference-free movement path to the NC program generator.

4. The simulation apparatus of claim 3, wherein:
the simulation executor is configured to, in a case where the movement of the movable structure is for machining a workpiece, calculate a depth of cut in the machining, and
the NC program generator is configured to correct machining conditions in the NC program to be generated in accordance with the depth of cut calculated by the simulation executor.

5. A simulation apparatus for manual operation of machine tool having structures including at least one movable structure, a drive member driving the movable structure, a numerical controller controlling operation of the drive member, and a display device, the simulation apparatus comprising:

a model data storage storing at least model data relating to the movable structure and model data relating to other structures having a possibility of interference with the movable structure within a movable area of the movable structure;

a display controller displaying images relating to a model of the movable structure and models of the other structures on the display device;

a manual operation signal generator having a manual operation unit and generating a manual operation signal for moving an image of the movable structure displayed on the display device in accordance with operation of the manual operation unit;

a simulation executor reading out the model data stored in the model data storage, arranging models relating to the other structures in a determined positional relationship and arranging a model relating to the movable structure in a predetermined positional relationship, and displaying an image relating to the models on the display device through the display controller, and receiving the manual operation signal generated by the manual operation signal generator and displaying an image in which the model relating to the movable structure is moved in accordance with the received manual operation signal on the display device through the display controller; and an NC program generator receiving information relating to the manual operation signal and a movement path of the movable structure from the simulation executor and generating an NC program based on the received manual operation signal information and movement path, the simulation executor being configured to also check whether interference occurs between the models of the structures when moving the model relating to the movable structure in accordance with the manual operation signal,
in a case where interference occurs, immediately stop the movement of the model relating to the movable structure and provide a display indicating the occurrence of interference on the display device through the display controller, and
in a case where an interference-free movement path of the movable structure is confirmed, transmit information relating to the received manual operation signal and the interference-free movement path to the NC program generator, the simulation executor being further configured to, in a case where the movement of the movable structure is for machining a workpiece, calculate a depth of cut in the machining, and
the NC program generator being configured to correct machining conditions in the NC program to be generated in accordance with the depth of cut calculated by the simulation executor.

* * * * *